US007734023B2

(12) United States Patent
Bettis et al.

(10) Patent No.: US 7,734,023 B2
(45) Date of Patent: *Jun. 8, 2010

(54) SYSTEM AND METHOD FOR MESSAGE STORAGE ASSURANCE IN A GEOGRAPHICALLY DISTRIBUTED VOICE MESSAGING SYSTEM

(75) Inventors: Sonny R. Bettis, Lawrenceville, GA (US); Jon S. Plotky, Lawrenceville, GA (US); Ian M. Moraes, Suwanee, GA (US); Philip L. Lowman, Ellijay, GA (US); James H. Spencer, Tucker, GA (US)

(73) Assignee: Glenayre Electronics, Inc., Duluth, GA (US)

( * ) Notice: Subject to any disclaimer, the term of this patent is extended or adjusted under 35 U.S.C. 154(b) by 643 days.

This patent is subject to a terminal disclaimer.

(21) Appl. No.: 11/170,499

(22) Filed: Jun. 29, 2005

(65) Prior Publication Data

US 2006/0002522 A1    Jan. 5, 2006

Related U.S. Application Data

(60) Provisional application No. 60/584,270, filed on Jun. 30, 2004.

(51) Int. Cl.
*H04M 1/64* (2006.01)
(52) U.S. Cl. .................................. 379/88.25; 379/88.17
(58) Field of Classification Search ................. 707/201; 709/206; 455/412, 412.2, 413; 379/88.08–88.12, 379/88.18, 88.22, 88.27, 88.28, 88.23–88.25, 379/88.17
See application file for complete search history.

(56) References Cited

U.S. PATENT DOCUMENTS

| | | | | |
|---|---|---|---|---|
| 4,935,954 A * | 6/1990 | Thompson et al. | ........ | 379/88.04 |
| 5,559,859 A * | 9/1996 | Dai et al. | ..................... | 455/459 |
| 5,909,483 A * | 6/1999 | Weare et al. | ............. | 379/88.18 |
| 5,995,596 A * | 11/1999 | Shaffer et al. | ............ | 379/88.18 |
| 6,002,779 A * | 12/1999 | Johnston | ...................... | 381/80 |
| 6,009,469 A * | 12/1999 | Mattaway et al. | ............ | 709/227 |
| 6,061,432 A * | 5/2000 | Wallace et al. | ........... | 379/88.18 |
| 6,188,887 B1 * | 2/2001 | Joong et al. | .................. | 455/417 |
| 6,317,484 B1 * | 11/2001 | McAllister | ............... | 379/88.02 |
| 6,438,215 B1 * | 8/2002 | Skladman et al. | .......... | 379/67.1 |
| 6,490,564 B1 * | 12/2002 | Dodrill et al. | ............... | 704/275 |
| 6,690,663 B1 * | 2/2004 | Culver | ........................ | 370/352 |
| 6,857,008 B1 * | 2/2005 | Shenefiel | .................... | 709/219 |
| 6,868,143 B1 * | 3/2005 | Menon et al. | ............ | 379/88.13 |
| 6,888,927 B1 * | 5/2005 | Cruickshank et al. | .... | 379/88.11 |
| 7,035,382 B1 * | 4/2006 | Shin et al. | ................ | 379/88.12 |
| 7,054,863 B2 * | 5/2006 | Lasensky et al. | ............... | 707/9 |
| 7,136,461 B1 * | 11/2006 | Swingle et al. | .......... | 379/88.13 |

(Continued)

*Primary Examiner*—Simon Sing
(74) *Attorney, Agent, or Firm*—Gregory Scott Smith

(57) ABSTRACT

A voice messaging system comprises a common message store, a local data store located remotely from the common message store, and a media server. The media server is operable to receive a call directed to a number serviced by the media server, prompt the user for a voice message, direct the voice message to the local data store for temporary storage, notify the common message store that the voice message is present in the local data store, respond to a request to transfer the voice message to the common message store, and direct the local data store to erase the message upon receipt of a communication from the common message store that the voice message was successfully saved.

9 Claims, 13 Drawing Sheets

U.S. PATENT DOCUMENTS

| | | | |
|---|---|---|---|
| 7,184,523 B2 * | 2/2007 | Dixit et al. | 379/88.17 |
| 7,308,083 B2 * | 12/2007 | Bettis et al. | 379/88.17 |
| 7,436,939 B1 * | 10/2008 | Packingham et al. | 379/88.12 |
| 2001/0019951 A1 * | 9/2001 | Haumont et al. | 455/413 |
| 2002/0111991 A1 * | 8/2002 | Wood et al. | 709/203 |
| 2002/0129174 A1 * | 9/2002 | LaBaw | 709/310 |
| 2006/0177007 A1 * | 8/2006 | Vaghar et al. | 379/67.1 |
| 2007/0117545 A1 * | 5/2007 | Doulton | 455/413 |
| 2008/0049909 A1 * | 2/2008 | Bettis et al. | 379/88.17 |

* cited by examiner

SYSTEM AND METHOD FOR MESSAGE STORAGE ASSURANCE IN A GEOGRAPHICALLY DISTRIBUTED VOICE MESSAGING SYSTEM

CROSS-REFERENCE TO RELATED APPLICATIONS

This application claims priority to U.S. provisional application entitled, "Message Durability For Voice Messaging System," filed Jun. 30, 2004 and accorded application No. 60/584,270, which is incorporated by reference herein in its entirety.

This application is related to co-pending U.S. utility patent application entitled "Distributed IP Architecture For Telecommunications System," filed Mar. 15, 2005 and accorded application Ser. No. 11/080,744, which is incorporated by reference herein in its entirety.

BACKGROUND OF THE INVENTION

1. Field of the Invention

Systems and methods that relate generally to voice messaging are invented and disclosed. More particularly, systems and methods for managing messages communicated using a voice messaging architecture with geographically distributed components.

2. Related Art

Over the past several decades, voice mail has continued to expand and establish itself as a key element in the successful operations of most businesses. Some voice mail systems consist of components that communicate with each other on the client side of a public switched telephone network (PSTN) and thus, have been geographically co-located. This can be a great disadvantage for companies that have geographically dispersed offices.

In today's global economy, even small businesses may have a need for multiple offices for serving clients, interacting with vendors, or various other reasons. Presently available wide area networks including the Internet support email, video conferencing and other products that allow dispersed business sites appear more seamless and integrated. In addition, wired and wireless telephonic networks provide network-based voice mail services that are used by small business and personal consumers to communicate with others wherever they may be located. Other telecommunication products have been developed to provide voice mail service to small businesses, and other institutions such as schools, hospitals, government offices, and the like. These other telecommunication products generally include local voice message storage.

However, a significant problem that still exists for geographically dispersed offices is providing a telephonic system that operates as a single, co-located system while still serving the specialized needs of the various offices. Establishing a separate data storage facility at each office can be a costly endeavor as duplicative hardware must be purchased and maintained at each site. Furthermore, logistics for enabling inter-office voice mail access can become complex.

A centralized storage facility could reduce cost and provide a seamless voice mail platform. However, integrating a centralized storage facility for voice messages across a geographically disperse enterprise is problematic because of system latency when processing voice messages between remotely located sites. One component of system latency is the time it takes to identify the particular storage medium where the message was stored and correctly position a read/write mechanism proximal to the identified medium. System latency is also affected by the speed and capacity of the underlying network or networks used to couple remotely located sites to the central storage facility.

System latency presents a new challenge. On the one hand, the subscriber needs assurance that the voice message was delivered and properly stored at a central location. On the other hand, requiring the subscriber to wait for delivery of the voice message and for confirmation from the central storage facility of the received voice message is not desirable. Accordingly, further improvements to geographically disperse voice mail systems are desired.

SUMMARY

An embodiment of a system for message storage assurance comprises a common message store, a local data store located remotely from the common message store, and a media server. The media server is operable to receive a call directed to a number serviced by the media server, prompt the user for a voice message, direct the voice message to the local data store for temporary storage, notify the common message store that the voice message is present in the local data store, respond to a request to transfer the voice message to the common message store, and direct the local data store to erase the message upon receipt of a communication from the common message store that the voice message was successfully saved.

Related methods of operation are also provided. An embodiment of a method for message storage assurance comprises polling a local data store co-located with a local voice mail system to determine if a voice message has been stored to the local data store, notifying a common message store, located remotely from the local data store, when the voice message is present in the local data store, transferring the voice message from the local data store to the common message store, and waiting for a communication from the common message store of successful receipt of the voice message.

Other features and advantages of the systems and methods for message storage assurance will be or become apparent to one with skill in the art upon examination of the following figures and detailed description. All such additional features and advantages are within the scope of the systems and methods for message storage assurance in a geographically distributed messaging system as protected by the accompanying claims.

BRIEF DESCRIPTION OF THE FIGURES

The systems and methods for message storage assurance can be better understood with reference to the following figures. The components within the figures are not necessarily to scale, emphasis instead being placed upon clearly illustrating the principles of message storage assurance in a geographically distributed messaging system. Moreover, in the figures, like reference numerals designate corresponding parts throughout the different views.

DETAILED DESCRIPTION

A distributed telecommunications system provides functionality to support modern small or large office business settings, such as call forwarding, auto-attendant, voice mail, voice messaging, etc. The telecommunications system is made up of components that can be located in various locations that are remote from each other. Each of the components is coupled to an Internet protocol (IP) based wide-area network. The system provides message storage assurance to subscribers and enables a caller to generate a message and terminate the communication with a voice recorder without having to wait on-the-line for a confirmation that the voice message was successfully delivered and stored. The system also provides message durability in that once the voice message is recorded, the system ensures that despite device and network service outages, the voice message is saved in the common message store.

Figure 1:
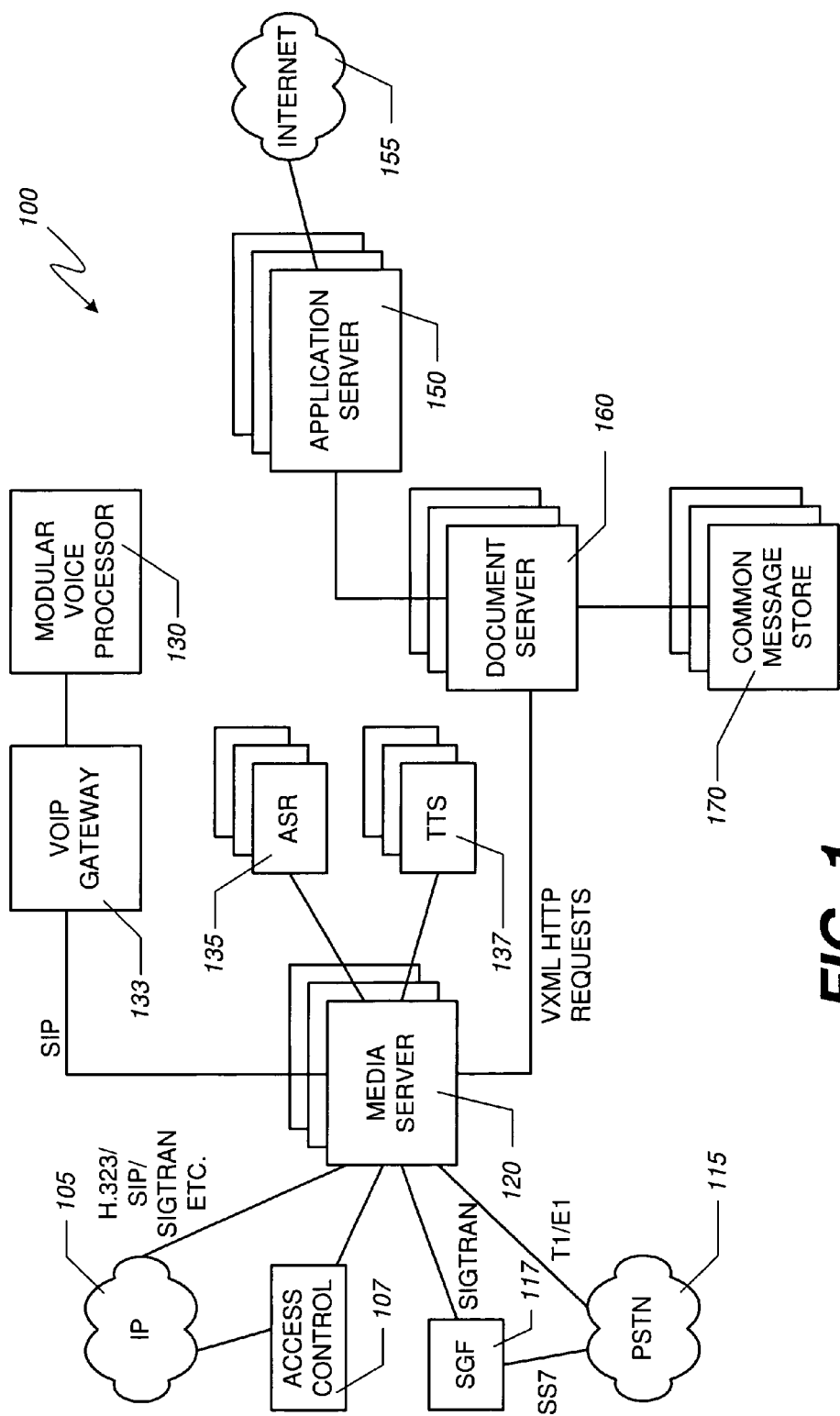
FIG. 1 is a block diagram illustrating an embodiment of geographically distributed messaging system.

A geographically distributed messaging system 100 comprising a media server 120, document server 160, and a common message store 170, provides for message storage assurance and durability of voice messages. Media server 120 couples the distributed messaging system 100 to one or more networks. Document server 160, located remotely from the media server 120, manages storage of voice messages in common message store 170. The complexities of interfacing to telecommunications networks such as the public switched telephone network (PSTN) 115 are handled through a signaling gateway function (SGF) 117 coupled between media server 120 and PSTN 115 with SigTran protocol used in the link between media server 120 and SGF 117 and signaling system 7 (SS7) is used to perform out-of-band signaling in support of the call-establishment, billing, routing, and information-exchange functions between SGF 117 and PSTN 115. As illustrated in FIG. 1, media server 120 is also coupled to PSTN 115 via T1/E1 or other multiple channel links.

A voice over IP (VoIP) gateway 133 integrates the media server 120 with a modular voice processor 130 or other devices that use session initiation protocol (SIP). Access control 107 manages the complexities of integrating multiple media servers 120 with Internet protocol (IP) network 105. When a single media server 120 is used, a communication link using SIP, SigTran, or the H.323 messaging protocols couples media server 120 to IP network 105. One or more automatic-speech recognition (ASR) modules 135 and one or more text-to-speech (TTS) conversion modules are coupled to media server 120 to enable both audio and text input and output to/from distributed messaging system 100. A voice over IP (VoIP) gateway 133 integrates the media server 120 with a modular voice processor 130 or other devices that use session initiation protocol (SIP). A simplified protocol is used for communications between the remaining components of the distributed messaging system.

Voice extensible markup language (VoiceXML or VXML) is one mode of communication between media server 120 and remotely located document server 160. VXML, which uses hypertext transfer protocol (HTTP) to communicate information in packets, allows a user to interact with devices coupled to IP networks using voice-recognition technology. Instead of a traditional graphical user interface based browser, VXML relies on a voice browser and/or any of a plethora of voice-based devices such as telephones, mobile phones and combination devices. Instead of a traditional browser that relies on a keyboard and a mouse, VXML relies on a voice browser and a voice-based device. Using VXML, the user interacts by listening to audio output that is either pre-recorded or synthesized and submits input through the user's natural speaking voice or a touch-tone keypad. VXML is designed for creating audio dialogs that feature synthesized speech, digitized audio, and recognition of spoken and dual-tone multiple frequency encoded inputs, recording of voice messages, and mixed conversations. As will be explained in further detail below, VXML HTTP requests are communicated from media server 120 to document server 160, which manages the storage, confirmation, and retrieval of voice messages saved in common message store 170.

Application server 150, coupled to document server 160 and Internet 155, provides a mechanism for subscribers of the distributed messaging system and third-parties with proper access privileges to access previously stored voice messages from common message store 170.

Messages are durable when once a subscriber records a message in a VXML session, the message is saved and accessible via a common message store remotely located from the subscriber despite media server 120 failures, document server 160 failures and wide area network service outages. This is accomplished because message storage from a local data store to the remotely located common message store can be asynchronous. That is, the subscribing caller does not need to wait on-the-line for acknowledgement of a successful transfer of the message. Because the common message store comprises an array of disks, the messages and metadata stored therein can survive numerous device failures and request restarts for transfers of message blocks.

Figure 2:
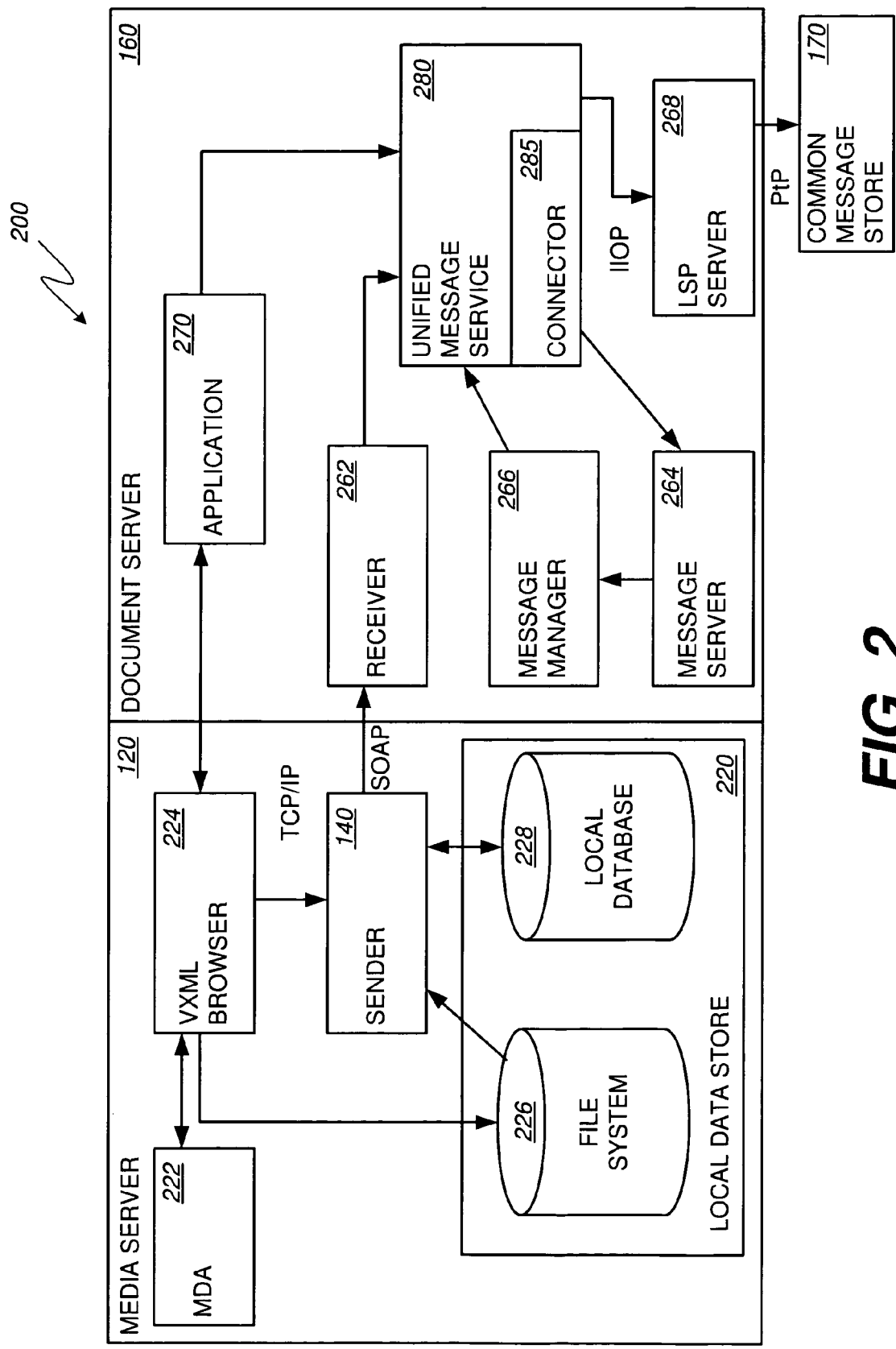
FIG. 2 is a block diagram illustrating an embodiment of a message durability subsystem that can be implemented within the distributed messaging system of FIG. 1.

FIG. 2 is a functional block diagram illustrating an embodiment of a message durability subsystem 200 that can be implemented within the distributed messaging system 100 of FIG. 1. The message durability subsystem 200 comprises media server 120, document server 160, and common message store 170. Media server 120 comprises a message deposit application 222 coupled to VXML browser 224. Message deposit application 222 prepares and controls the media server 120 to enable message recording. VXML browser 224 is further coupled to sender 140 and local data store 220. VXML browser 224 communicates with sender 140 via TCP/IP. Local data store 220 comprises file system 226, which provides a filename and path to associate with the actual voice data and database 228, which saves and associates metadata with a recorded voice message.

Sender 140 communicates requests to document server 160 via simple object access protocol (SOAP). Sender 140 provides a socket connection for VXML browser 224. The socket connection can be accessed by multiple languages using multiple computing platforms. Request information transferred to the document server 160 includes attachment file path and name, message type identifier, message status identifier, time for delivery, originator identifier, and identifiers for one or more recipients. Sender 140 is configured to save the request including message request delivery state information into local data store 220, send message header information (metadata) together with the attachment file to the document server 160, delete the request and delivery information when the message has been successfully delivered to the document server 160, and retry delivery for messages that are not successfully delivered.

Document server 160 comprises receiver 262, message server 264, message manager 266, unified message service 280, layered service provider server 268, and application 270. Receiver 262 is configured to receive the SOAP requests from sender 140, retrieve the message information and attachments, invoke the unified message service to create a Java message service message and save the created message in message server 264 persistently. Receiver 262 is further configured to handle SOAP fault reporting when data transfer errors occur. Unified message service 280 communicates with message server 264 via connector 285. Message server 264 provides persistent storage to the message and related data on the document server 160, asynchronous message delivery, ensures once-and-only-once delivery of the message to the common message store 170, and deletes the message when the message has been successfully stored in the common message store 170. Message manager 266 gets messages from the message server 264, then forwards them to the common message store 170 using the link provided by the unified message service application interface and the layered service provider server 268. Message manager 266 is configured to status the message server 264 regarding whether the message was successfully delivered to the common message store 170. Message manager 266 is further configured to retry message delivery for messages that were not successfully uploaded and integrated with the common message store 170.

Two approaches for providing message attachment are contemplated. The first approach is that the attachment content of the SOAP message received by the receiver 262 is delivered to the message server 264 together with the header information or metadata as one Java message service compatible message without writing to an intermediate file. Using this approach, the receiver 262 and the message server 264 have the flexibility to be distributed so that any document server is able to deliver a message stored in the message server 264 to the common message store.

The alternative approach is that the attachment content of the SOAP message received by receiver 262 is saved into a file, then the file name and message metadata are delivered to the message server 264. Using this approach, the message server handles text data only.

Application server 270, interposed between unified message service 280 and VXML browser 224, exposes previously stored messages to one or more subscribers communicatively coupled to media server 120.

Figure 3:
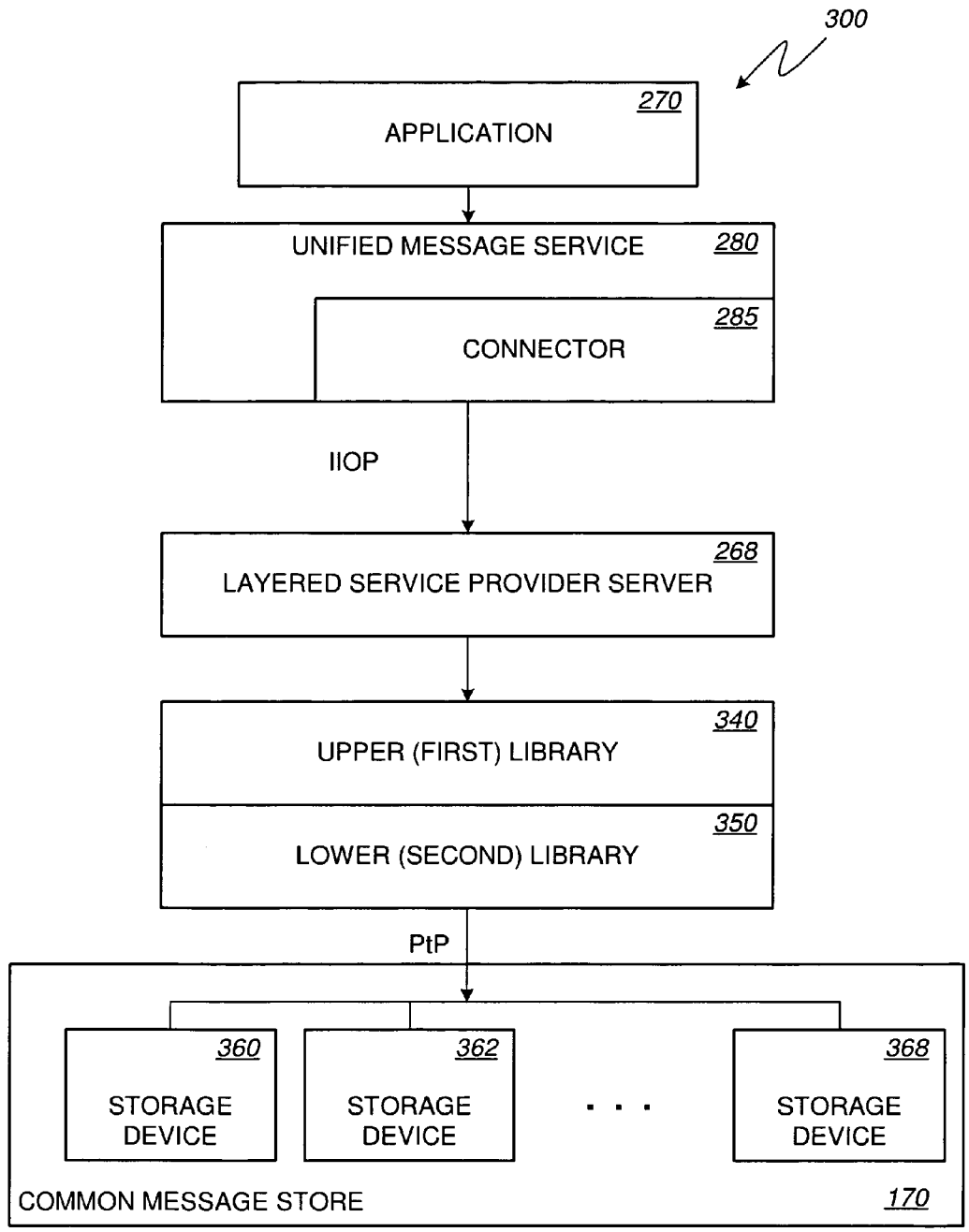
FIG. 3 is a functional block diagram of an embodiment of a message channel from the document server to the common message store of the message durability subsystem of FIG. 2.

FIG. 3 is a functional block diagram of an embodiment of a message channel 300 that links document server 160 to the common message store 170 of the message durability subsystem 200 of FIG. 2. As indicated in FIG. 3, application 270, operable on or in communication with document server 160, is coupled via unified message service 280 and a layered service provider (LSP) server 268 to an upper library 340 and lower library 350. The unified message service 280 includes a connector 285 configured as a common object request broker architecture (CORBA) client. Layered service provider server 268 is configured as CORBA server. Layered service provider server 268 provides a robust, efficient and scalable message and subscriber preference adjustable service. Connector 285 communicates with layered service provider server 268 via Internet Inter-ORB protocol (IIOP). Upper library 340 is a high-level application interface that encapsulates device-specific logic in lower library 350. Upper library 350 includes multiple functions for supporting messaging services. Lower library 350 uses a peer-to-peer protocol to communicate with storage device 360, storage device 362, and storage device 368 and additional storage devices (not shown) under the management and control of common message store 170.

Figure 4:
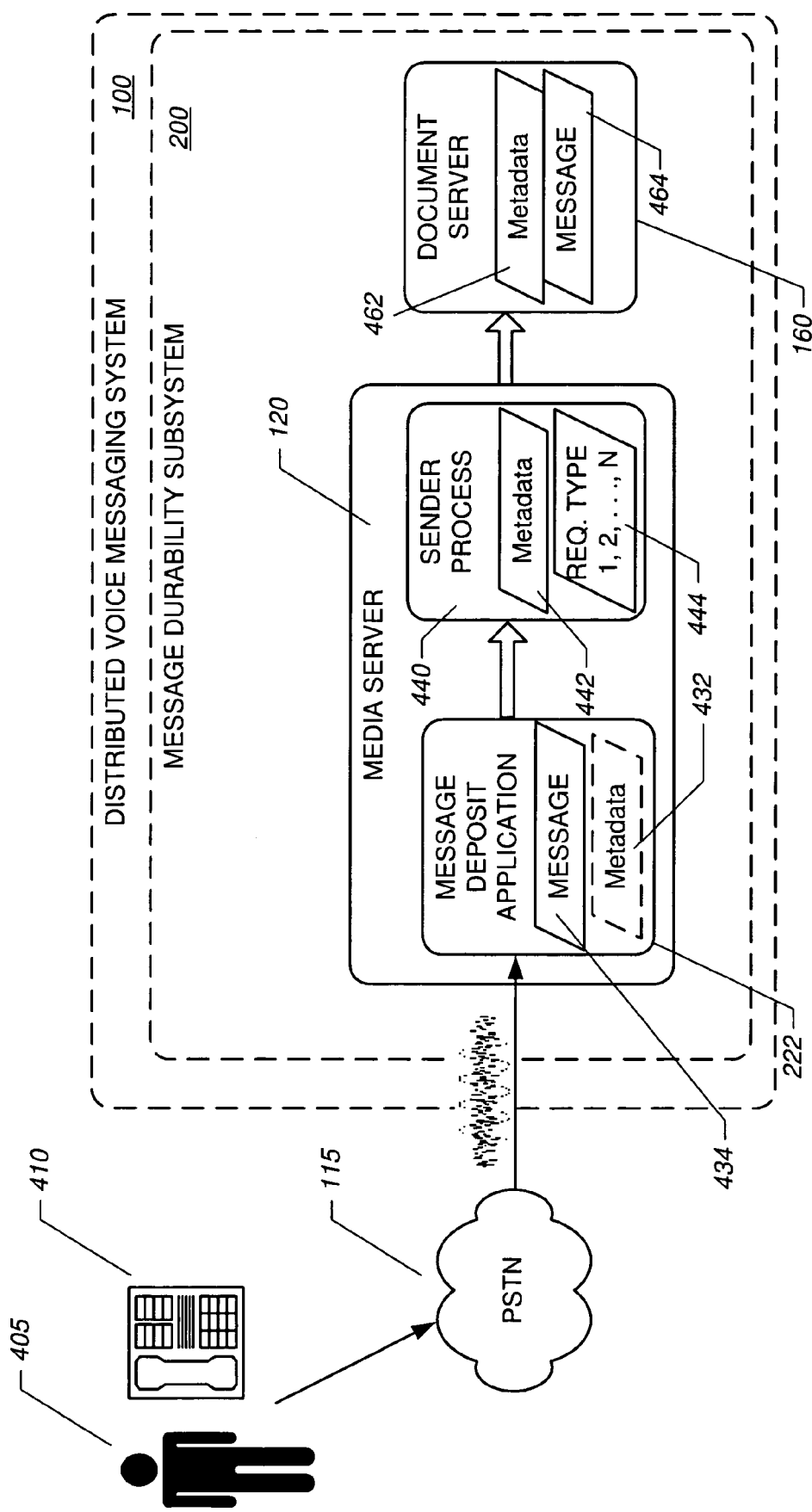
FIG. 4 is a schematic diagram illustrating an embodiment of the distributed messaging system of FIG. 1 when a subscriber generates a voice message.

FIG. 4 is a system diagram illustrating the components and data flow within the distributed messaging system 100. Distributed voice messaging system 100 includes a message durability subsystem 200, which comprises media server 120, document server 160, and a common message store (not shown). The media server 120 can be configured with internal and or externally coupled data storage devices used to provide the previously introduced file system 226 and local data store 228 functions. Media server 120 is communicatively coupled to remotely located document server 160 via a packet-switched wide area network. Media server 120 is further coupled to PSTN 115.

In operation, subscriber 405 initiates a call with a telephone 410 at a location coupled to PSTN 115. The call is established over PSTN 115 and terminated by media server 120, which provides the telephony interface between PSTN 115 and distributed messaging system 100. Message deposit application 222, operable within media server 120, generates a new filename for the message about to be recorded and collects or otherwise generates new metadata 432 in accordance with one or more identifiers used to classify or otherwise describe the nature of the call, subscriber, and the voice message. Metadata 432 is associated with the filename.

The message deposit application 222 addresses the VXML browser 224, sender 140, file system 226, and local data store 228 to ensure the media server 120 is prepared to record the voice message. If any of these devices reports a non-ready condition to the message deposit application 222, the message deposit application 222 immediately informs the subscriber 405 that a system failure has occurred that the message cannot be recorded and aborts the recording process. Otherwise, if each of the media server devices is ready, voice message 434 is recorded and temporarily stored within media server 120. Thereafter, the subscriber 405 can access other system functions or terminate the call without waiting for acknowledgment that the voice message 434 has been saved in the common message store 170.

The message deposit application 222 in accordance with a self-generated initialization trigger or an externally generated signal forwards a request to sender process 440 to forward the data to remotely located document server 160. Sender process 440 accepts the request 444, saves the request 444 and metadata 442 in a local database, and forwards the request 444 via an IP based network to a receiver associated with the document server 160. The document server 160, in turn saves a received copy of metadata 462 and message 464 in a common data store 170 (not shown).

Figure 5:
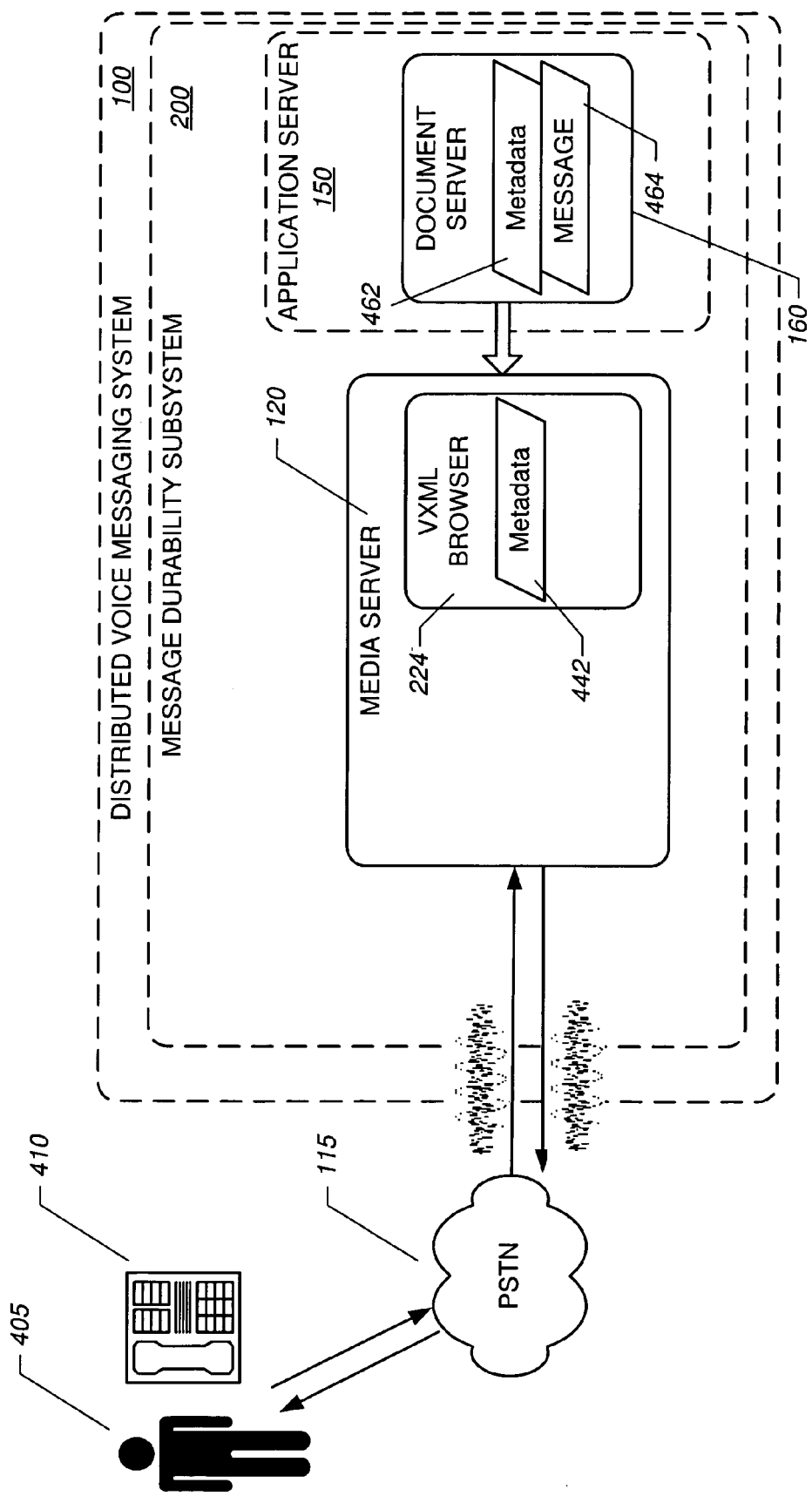
FIG. 5 is a schematic diagram illustrating an embodiment of the distributed messaging system of FIG. 1 when a subscriber retrieves a voice message.

FIG. 5 is a schematic diagram illustrating an embodiment of the distributed messaging system of FIG. 1 when a subscriber retrieves a voice message. As indicated by the illustrated embodiment, document server 160 may be associated with or controlled by various applications operable on application server 150. Thus, a subscribing user with appropriate access to an IP based network that is coupled to application server 150 can access, review, comment, and forward previously stored voice messages integrated via document server 160 in common message store 170. In addition to providing access to subscribers via application server 150, previously stored voice messages can be returned to a subscribing caller 405 coupled to the distributed voice messaging system 100 via PSTN 115. One or more applications operable on or in communication with document server 160 can return voice messages via VXML browser 224 associated with media server 120.

Figure 6:
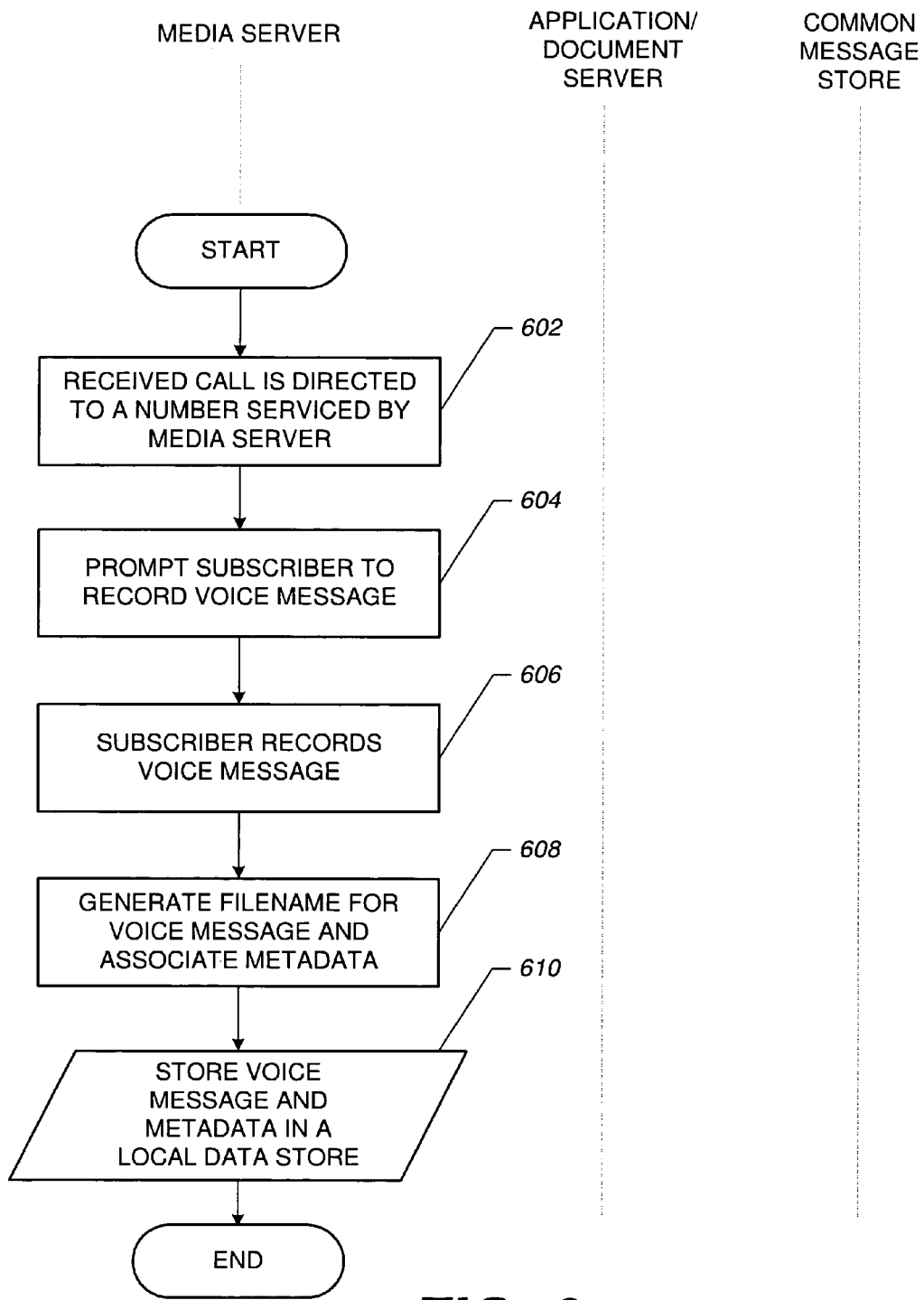
FIG. 6 is a flow diagram illustrating an embodiment of a method for generating and locally storing a voice message.

FIG. 6 is a flow diagram illustrating an embodiment of a method 600 for generating and locally storing a voice message. As described above, the media server 120 is configured to record and locally store incoming voice messages. Media server 120 provides the locally stored voice messages to document server 160 at an appropriate time for transfer to common message store 170. Media server 120 is configured with appropriate processing resources to concurrently store one or more incoming voice messages in a local data store coupled to the media server 120, while allowing access to previously stored "local" voice messages.

Method 600 begins with block 602 where a call, originated by a subscriber of the distributed voice messaging system 100 (FIG. 1) is serviced by media server 120. Next, as indicated in block 604, the subscriber is prompted to record a voice message at some time during the call. The subscriber records the voice message, as shown in block 606. Thereafter, media server 120 generates a filename for the voice message and associates appropriate metadata for identifying the voice message, as indicated in block 608. After the voice message has been recorded, the filename, voice message and any header information, such as metadata is stored in a local data store 228, as indicated in input/output block 610.

Metadata associated with the voice message includes storage location, type, caller, session, urgency, and confidentiality identifiers. The local storage location identifier contains an absolute path and filename of the data file on local file system 226. The type identifier indicates whether the processed message is a voice or a fax message. The caller identifier indicates a subscriber identification if the message depositor is a subscriber of the system. Otherwise, the caller is identified as a "guest." The session identifier indicates a depositor session identification. The urgency identifier indicates whether the associated message is a high priority message or a standard priority message that may be processed and addressed in due course. The confidentiality identifier indicates whether the message is designated for access to a limited number of recipients. Metadata associated with the voice message also identifies the message sender and one or more message recipients.

Additional and optional metadata associated with a voice message may include information indicative of a preferred date and time for delivery. When not associated with the message the media server 120 is configured to periodically initiate the transfer of a new message to common message store 170.

Conditional metadata is also associated with some messages processed by the distributed messaging system 100. For example, conditional metadata identifies when the stored voice message is a comment referring to an attached forwarded message. In addition to a forwarded message identifier, conditional metadata includes forwarded message note and dictation length identifiers. The forwarded message identifier is the message identifier associated with the forwarded voice message. The forwarded message note identifier is a separate identifier associated with a note or comment regarding the forwarded message. The dictation length identifier indicates the length of the forwarded message associated with the note.

Figure 7:
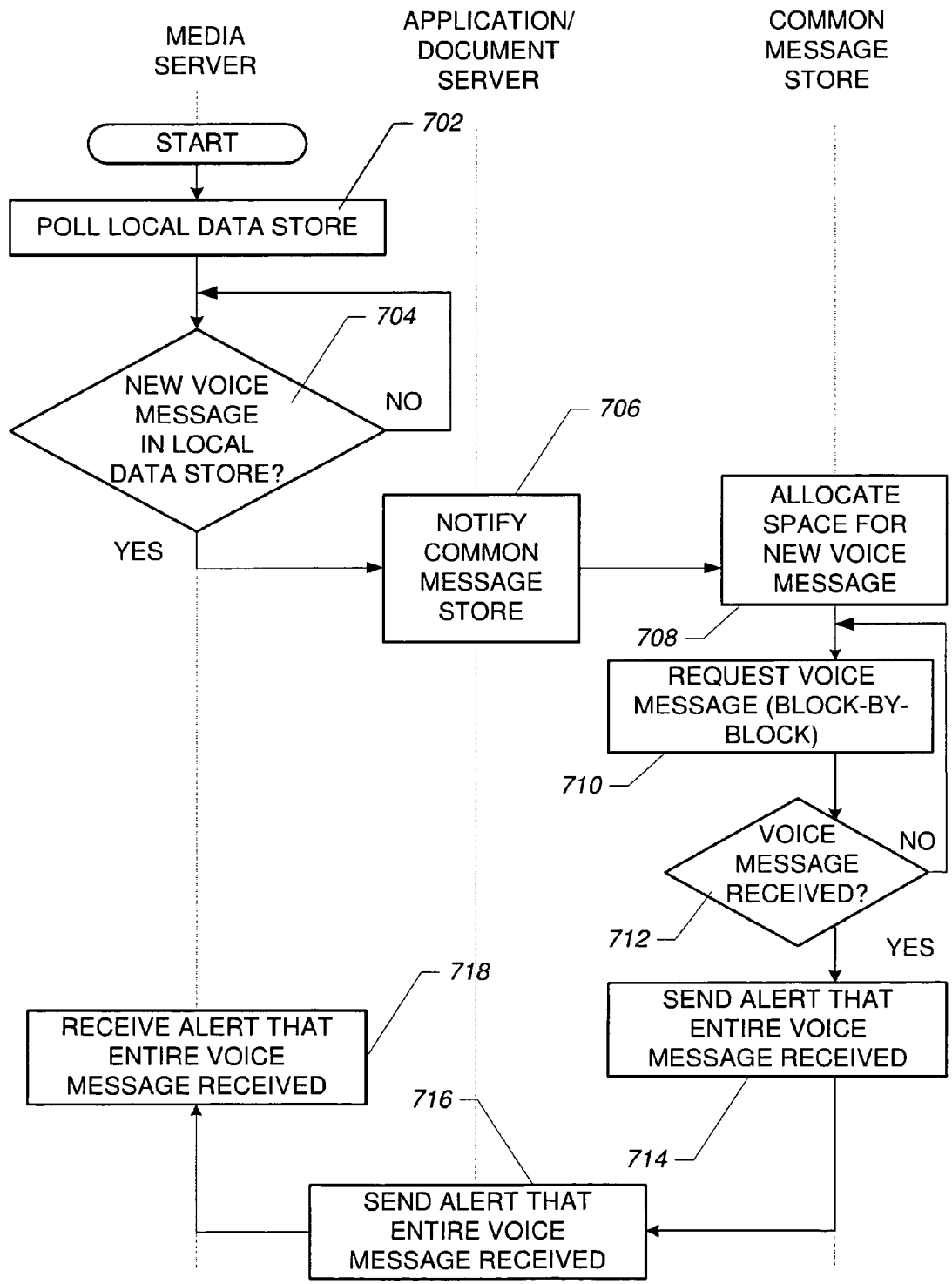
FIG. 7 is a flow diagram illustrating an embodiment of a method for message storage assurance that can implemented using the distributed messaging system of FIG. 1.

FIG. 7 is a flow diagram illustrating an embodiment of a method for message storage assurance 700 that can be implemented using the distributed messaging system 100 of FIG. 1. The method for message storage assurance 700 involves forwarding the locally-recorded and stored messages at the appropriate time to the common message store 170 and sending confirmation back to the media server 120 that the message has been stored. The method for storage assurance 700 begins with block 702 by polling the local data store associated with the media server 120 for new voice messages 434. When a new voice message 434 has been detected, as indicated by a positive response from query 704, the media server 120 provides an indication to the document server 160, which in turn, notifies the common message store 170 in block 706 of the presence of the new message.

As indicated in block 708, the common message store prepares space for the new voice message designated for integration in common message store 170. Next, as shown in block 710 and query block 712, common message store 170 requests message content using a block-by-block repetitive process until the entire message has been delivered via the document server 160 and received in the common message store 170. Once the entire message has been received, common message store 170 sends an acknowledgement that the entire message has been received, as shown in block 714. The acknowledgement issued from the common message store 170 is received and forwarded by document server 160 as shown in block 716. The acknowledgement received by document server 160 is forwarded to the media server 120 as shown in block 718. The acknowledgement received by media server 120 confirms that the voice message has been successfully stored and integrated with common message store 170. In an alternate embodiment, polling for new messages in the local data store 228 associated with the media server 120 may be performed by software or firmware operable within the document server 160 or by an application in communication with document server 160. In this way, one or more remotely located devices can be configured to monitor multiple media servers.

Figure 8A:
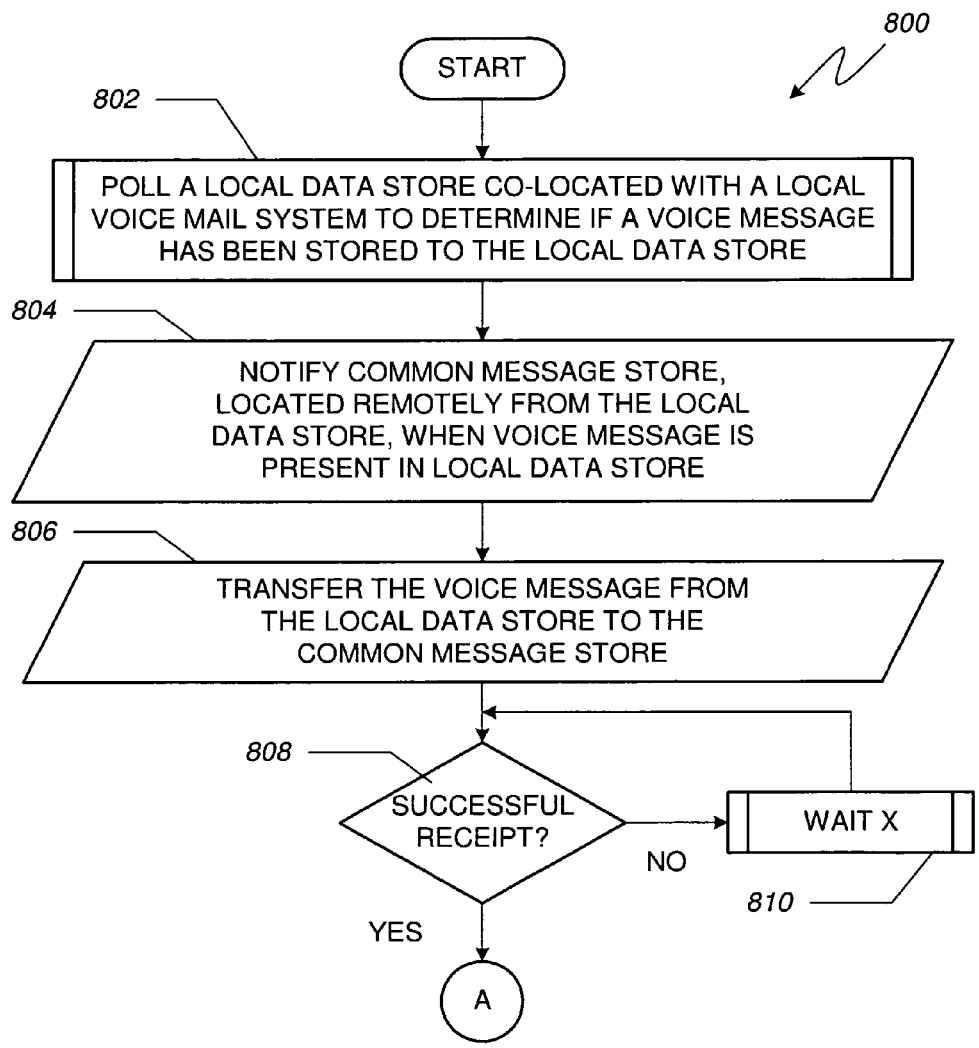
FIGS. 8A and 8B are a flow diagram illustrating an alternative embodiment of a method for message storage assurance that can implemented using the distributed messaging system of FIG. 1.
Figure 8B:
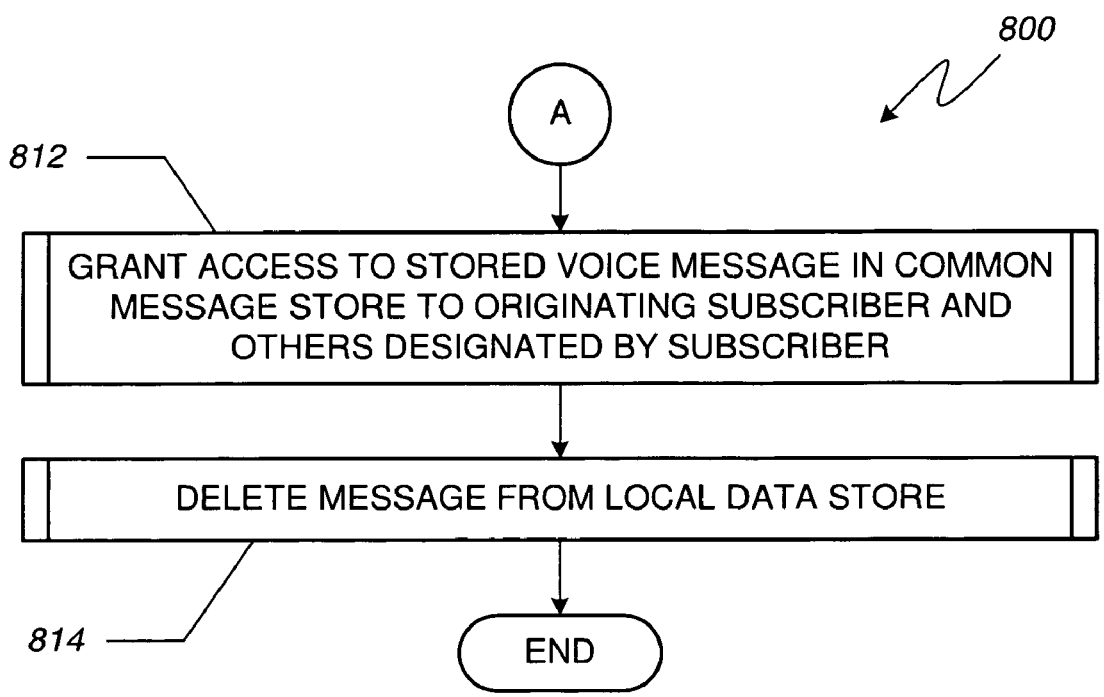

FIGS. 8A and 8B are a flow diagram illustrating an alternative embodiment of a method 800 for message storage assurance that can implemented using the distributed messaging system 100 of FIG. 1. Method 800 begins with block 802 where a local data store 228 co-located with a local voice mail system is polled to determine if a voice message has been stored to the data store 228. Thereafter, as indicated by input/output block 804, the common message store 170 is notified that a new voice message is present in the (remotely located) local data store 228. Next, the voice message is transferred to the common message store 170 from the local data store 228 as illustrated in input/output block 806. A query 808 and an associated wait process 810 are repetitively performed until the voice message has been successfully stored in its entirety in the common message store 170. At this point, the voice message has been stored in the common message store 170. As indicated by connector A, which associates the steps illustrated in FIG. 8A with those shown in FIG. 8B, method 800 continues with block 812 where the stored voice message is made available to the subscriber and those with access privileges that are communicatively coupled to the document server 160 and common message store 170. In block 814, the message stored in the local data store 228 is deleted. The functions illustrated in blocks 812 and 814 may be performed out-of-sequence or substantially simultaneously.

Figure 9A:
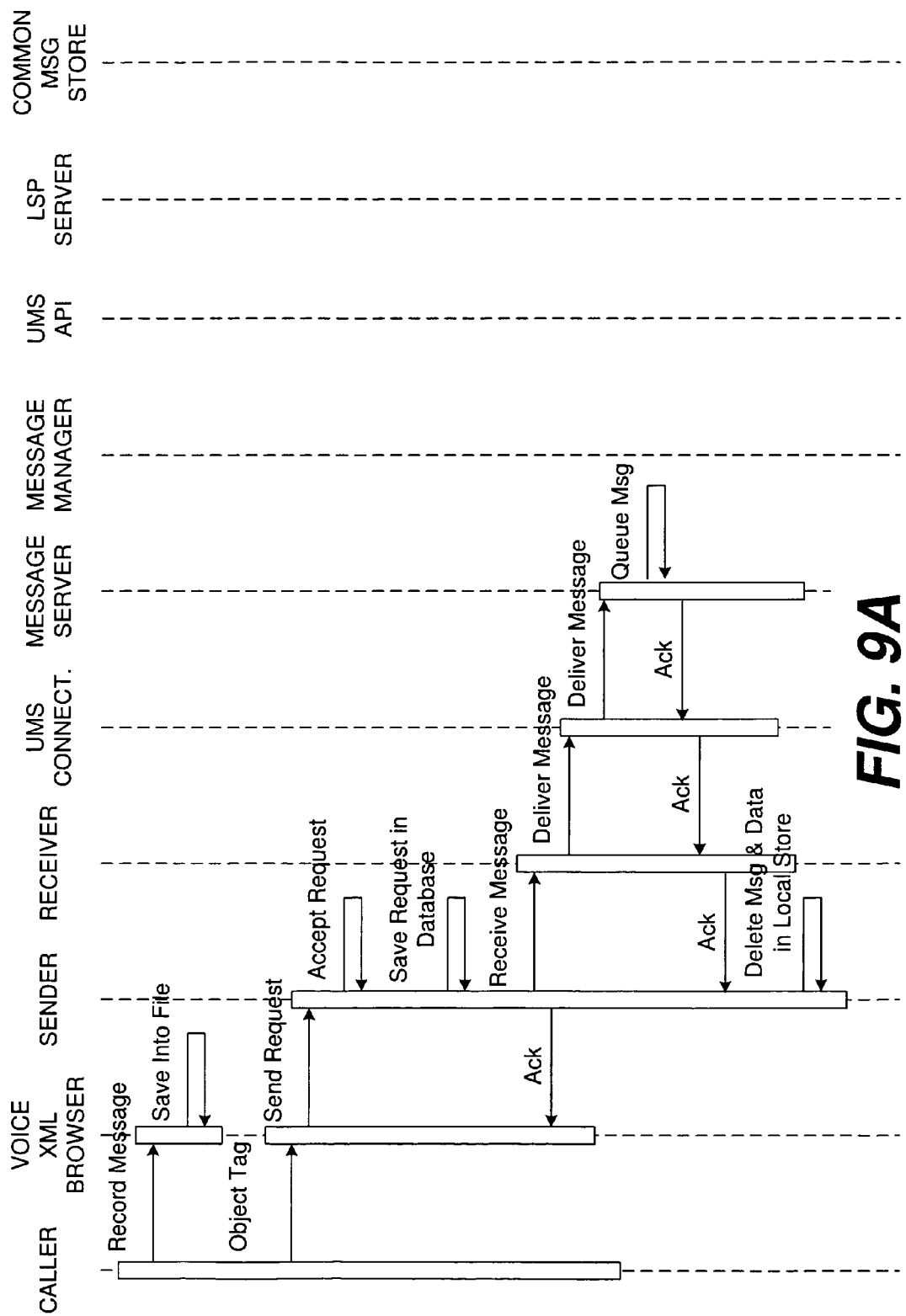
FIGS. 9A and 9B are a datagram illustrating an embodiment of message flow through the system of FIG. 1 during a message store.
Figure 9B:
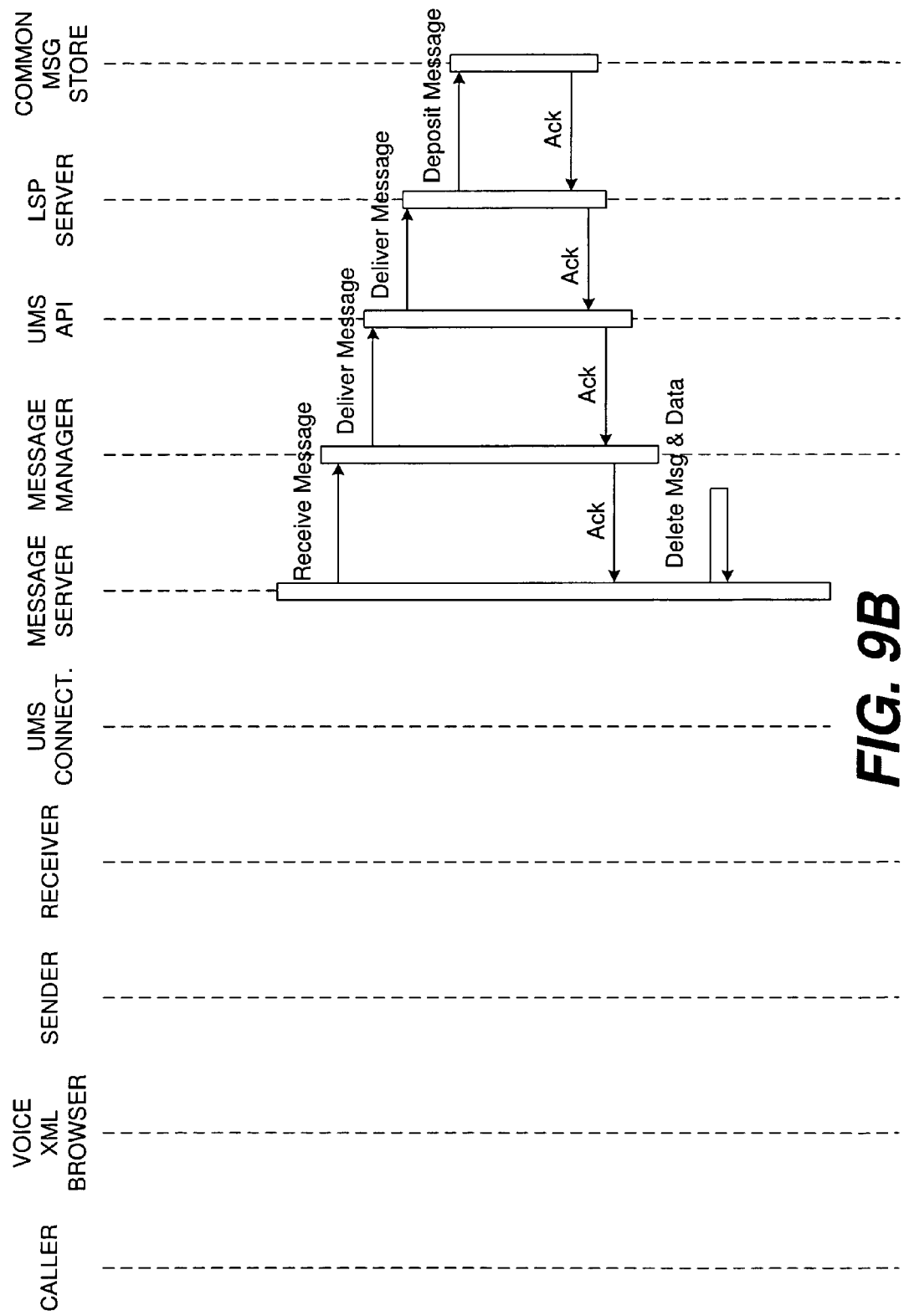

FIGS. 9A and 9B are a datagram illustrating an embodiment of message flow through the distributed message system 100 of FIG. 1 during a message transfer from local data store 228 to common message store 170. As shown in the sample embodiment, a host of communications are sent and received by various system entities. A caller device both records a message and forwards an object tag to a VXML browser. The VXML browser saves or otherwise associates the recorded message into a file and sends a request to temporarily store the message in the local data store. A sender process accepts the request, saves the request in a local database, forwards the request to a receiver associated with the document server 160. The receiver delivers the message via a unified message service to a message server. The message server queues the message request, receives, and forwards the message to a message manager. The message server retains the message and associated metadata until it receives an acknowledgement from the message manager that the message has been successfully processed into the common message store. In the illustrated embodiment, once the message server queues the message, an acknowledgement is forwarded to the VXML browser via the unified message service connection, receiver, and sender in that order. When the sender receives the acknowledgement that the message has been queued in the message server, the sender deletes the message and associated data that were temporarily stored in the local data store. In an alternative embodiment, the acknowledgement stream from the message server to the VXML browser may be withheld or otherwise delayed until the message server receives a positive acknowledgment from the common message store.

The message manager receives the message from the message server and forwards the message to a unified message service application interface, which in turn forwards the message via a LSP server that deposits the message in the common message store 170. Once the common message store has successfully deposited the message, an acknowledgement message identified by the associated message identifier is forwarded to the message server via the LSP server, unified message service application interface and message manager, in that order. In response, the message server deletes the message and associated metadata.

Figure 10A:
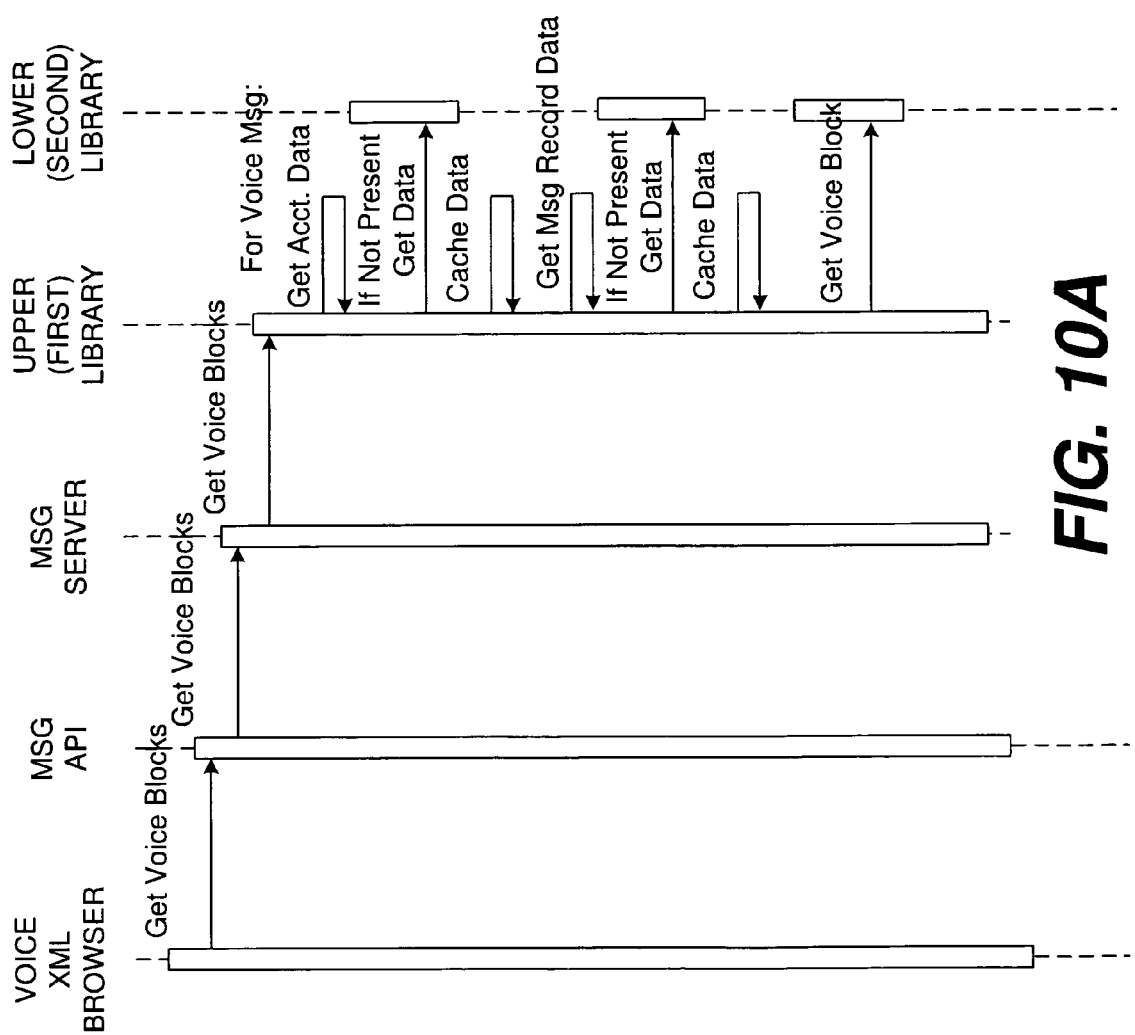
FIGS. 10A and 10B are a datagram illustrating an embodiment of message flow through the system of FIG. 1 during message retrieval.
Figure 10B:
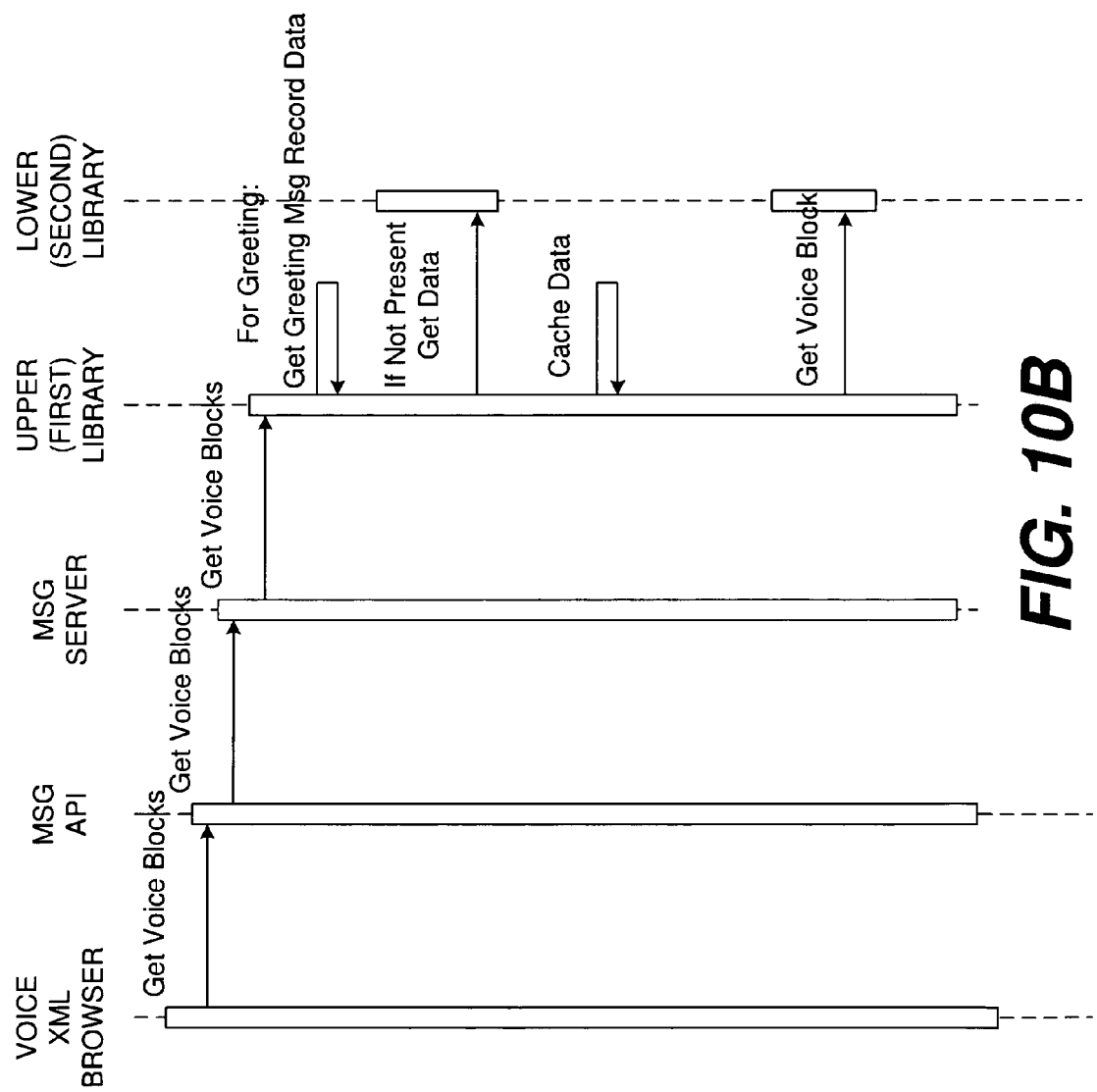

FIGS. 10A and 10B are a datagram illustrating an embodiment of message flow through the distributed messaging system 100 of FIG. 1 during message or greeting retrieval from common message store 170. As shown in the sample embodiment, a host of communications are sent and received by various system entities. A VXML browser initiates a request to get voice message blocks which is forwarded via a message application and message server to an upper or first library. When the request is for voice message blocks, the upper library responds to the request by issuing a get account data process. If the account data is not available in the upper library, the upper library forwards a request to get the account data from the lower or second library. The upper library caches the account data returned from the lower library. Thereafter, the upper library uses the cached account data to issue a request for message record data. If the message record data is not available in the upper library, the upper library forwards a request to the record data from the lower library. Thereafter, the upper library uses the record data to generate a request for a voice block. Not illustrated but implied by the datagram, the lower library responds by forwarding the identified voice block from the common message store which is returned to the VXML browser via the upper library, message server, and message application interface in that order.

When the request is for a greeting, the upper library responds to the request by issuing a get greeting message data process. If the greeting message data is not present in the upper library, the upper library forwards a request to get the greeting message data from the lower or second library. The upper library caches the greeting message data returned from the lower library. Thereafter, the upper library uses the cached greeting message data to issue a request for a voice block that includes the greeting. Not illustrated but implied by the datagram, the lower library responds by forwarding the identified voice block from the common message store which is returned to the VXML browser via the upper library, message server, and message application interface in that order.

The flow diagrams of FIGS. 6-8B and the datagrams of FIGS. 9 and 10 show the architecture, functionality, and operation of a possible implementation via software and or firmware associated with a host of communicatively coupled hardware devices that causes the process of collection, integration and distribution of voice-based messages to be performed. In this regard, each block represents a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in the flow diagram of FIG. 8B may in fact be executed substantially concurrently or the blocks may sometimes be executed in the reverse order, depending upon the functionality involved.

The operational software programs that may be used by the various devices of the distributed messaging system 100, as well as operational software that may be used in conjunction with the VXML browser, telephonic devices, and applications that interface with distributed messaging system 100, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While various embodiments of the systems and methods for message storage assurance have been described, it will be apparent to those of ordinary skill in the art that many more embodiments and implementations are possible that are within the scope of the accompanying claims. Accordingly, the systems and methods for message storage assurance are not to be restricted beyond the attached claims and their equivalents.

What is claimed is:

1. A method for voice message storage assurance, comprising:
- polling a local data store co-located with a local voice mail system to determine if a voice message has been stored to the local data store;
- notifying a common message store, located remotely from the local data store, when the voice message is present in the local data store;
- transferring, to the common message store, a copy of the voice message stored on the local data store, wherein transferring comprises communicating with an application program interface (API) to a first library and a second library, wherein:
  - the second library encapsulates storage device-specific logic; and
  - the first library includes functions for supporting messaging services and is configured to isolate a voice extensible mark-up language (VXML) browser from a device-specific protocol used by the second library in order to communicate message blocks to a storage device that is comprised within the common message store;
- requesting, via the common message store, message content using a block-by-block repetitive process via the first and second libraries; and
- waiting for a communication from the common message store of successful receipt of the voice message, wherein receipt of said communication is prerequisite to deleting the voice message from the local data store.

2. The method of claim 1, wherein polling a local data store comprises using a message deposit application executed by a media server to generate a request.

3. The method of claim 1, wherein notifying a common message store comprises communicating with a document server.

4. The method of claim 1, wherein transferring the voice message from the local data store comprises responding to a request from the common message store to forward a portion of the voice message.

5. The method of claim 1, wherein transferring the voice message from the local data store comprises responding to a request from the common message store to forward metadata associated with the voice message.

6. The method of claim 1, wherein waiting for a communication from the common message store comprises communicating with a document server.

7. The method of claim 1, wherein waiting for a communication from the common message store comprises communicating with a message deposit application executed by a media server.

8. The method of claim 7, wherein waiting for a communication from the common message store comprises receiving an alert from a document server.

9. The method of claim 1, further comprising:
- granting access to the stored voice message in the common message store to an originating subscriber communicatively coupled to the media server.

* * * * *